(12) United States Patent
Li et al.

(10) Patent No.: US 11,466,780 B2
(45) Date of Patent: Oct. 11, 2022

(54) MAGNETIC LIQUID SEALING DEVICE

(71) Applicant: Tsinghua University, Beijing (CN)

(72) Inventors: Decai Li, Beijing (CN); Sijie Ren, Beijing (CN); Yingsong Li, Beijing (CN); Pengdong Han, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 99 days.

(21) Appl. No.: 17/212,027

(22) Filed: Mar. 25, 2021

(65) Prior Publication Data

US 2022/0221061 A1    Jul. 14, 2022

(30) Foreign Application Priority Data

Jan. 13, 2021 (CN) .......................... 202110044066.0

(51) Int. Cl.
    *F16J 15/43*    (2006.01)
(52) U.S. Cl.
    CPC .................................... *F16J 15/43* (2013.01)
(58) Field of Classification Search
    CPC ..................................................... F16J 15/43
    See application file for complete search history.

(56) References Cited

U.S. PATENT DOCUMENTS

| 4,984,908 A | * | 1/1991 | Kronenberger | .......... F16J 15/43 |
| | | | | 277/412 |
| 6,623,165 B1 | * | 9/2003 | Akagami | ............ F16C 33/7813 |
| | | | | 384/477 |

FOREIGN PATENT DOCUMENTS

| CN | 104534099 A | * | 4/2015 | ................ F16J 15/18 |
| NL | 8601017 A | * | 11/1987 | .......... F16C 33/6644 |
| NL | 8601030 A | * | 11/1987 | .......... F16C 33/6644 |

* cited by examiner

*Primary Examiner* — Vishal A Patel
(74) *Attorney, Agent, or Firm* — Hodgson Russ LLP

(57) ABSTRACT

A magnetic liquid sealing device is provided. The magnetic liquid sealing device includes a housing, a rotating shaft, a pole shoe, a permanent magnet, and a first sealing ring. The rotating shaft is provided with an annular first stop portion, the pole shoe has a first end face and a second end face opposite to each other in an axial direction of the rotating shaft, and the permanent magnet is fitted over the rotating shaft. The first sealing ring is fitted over the rotating shaft, and includes a first part and a second part. The first part is sealedly fitted with at least one of the first end face and an inner peripheral surface of the housing, and an inner end of the second part is a first free end movably arranged along the axial direction of the rotating shaft.

7 Claims, 2 Drawing Sheets

MAGNETIC LIQUID SEALING DEVICE

CROSS REFERENCE TO RELATED APPLICATION

The present application claims the benefit of and priority to Chinese Application No. 202110044066.0, filed on Jan. 13, 2021, the entire disclosure of which is incorporated by reference herein.

FIELD

The present disclosure relates to a technical field of mechanical engineering sealing, and more particularly, to a magnetic liquid sealing device.

BACKGROUND

Magnetic liquid is a new kind of functional material that has emerged with developments of science and technology, and has magnetizability of a magnetic material and liquidity of a liquid. The magnetic liquid sealing technology is used in more and more industries due to its advantages of zero leakage, no wear, long service life and simple structure. A magnetic liquid sealing device in a related art includes a housing, a pole shoe, a permanent magnet and a rotating shaft. A sealing gap is defined between the pole shoe and the rotating shaft, and the sealing gap has a size of 0.1 mm-0.2 mm. Under an action of a magnetic field, a magnetic liquid is filled in the sealing gap, and nanometer-scale ferromagnetic particles in the magnetic liquid may be stably suspended for a long time and evenly dispersed in a base carrier liquid, thus enabling the magnetic liquid sealing device to have a good pressure resistance of sealing.

The magnetic liquid sealing device is mounted to a sealing chamber of an apparatus to seal a fluid in the sealing chamber. The apparatus may be a reactor. When the apparatus is in a working state, there generally is a high pressure between two adjacent pole teeth, and the closer to the sealing chamber, the higher the pressure between the two adjacent pole teeth. When the apparatus stops, since an external pressure of the magnetic liquid sealing device adjacent to the sealing chamber decreases suddenly, the pressure between the two adjacent pole teeth adjacent to the sealing chamber is higher than the external pressure, and the closer to the sealing chamber, the larger a pressure difference between two axial sides of the pole tooth, that is, the closer to the sealing chamber, the larger a pressure difference between two sides of the magnetic liquid at the sealing gap. The pressure difference tends to wash the magnetic liquid at the sealing gap out of the sealing gap, thus causing a reduction of the magnetic liquid at the sealing gap, which eventually affects the pressure resistance of sealing of the magnetic liquid sealing device, and even leads to a problem of sealing failure.

SUMMARY

The present disclosure seeks to solve at least one of the technical problems existing in the related art.

To this end, embodiments of the present disclosure propose a magnetic liquid sealing device with a good pressure resistance of sealing.

The magnetic liquid sealing device according to embodiments of the present disclosure includes: a housing defining a cavity therein; a rotating shaft rotatably arranged in the cavity and provided with an annular first stop portion; a pole shoe fitted over the rotating shaft, the pole shoe having a first end face and a second end face opposite to each other in an axial direction of the rotating shaft, the first end face being arranged between the first stop portion and the second end face in the axial direction of the rotating shaft; a permanent magnet fitted over the rotating shaft; a first sealing ring fitted over the rotating shaft, the first sealing ring including a first part and a second part, the first part being connected to or integrated with the second part, the first part being arranged at an outer side of the second part in an inner-outer direction, the first part being sealedly fitted with at least one of the first end face and an inner peripheral surface of the housing, the second part having an inner end and an outer end opposite to each other in the inner-outer direction, the inner end of the second part being a first free end movably arranged along the axial direction of the rotating shaft, the first free end having a first initial position in which the first free end is spaced apart from the first stop portion and adjacent to the first stop portion in the axial direction of the rotating shaft, and a first sealing position in which the first free end sealedly abuts against the first stop portion.

The magnetic liquid sealing device according to the embodiments of the present disclosure has advantages of a good pressure resistance of sealing or the like.

DETAILED DESCRIPTION

Figure 1:
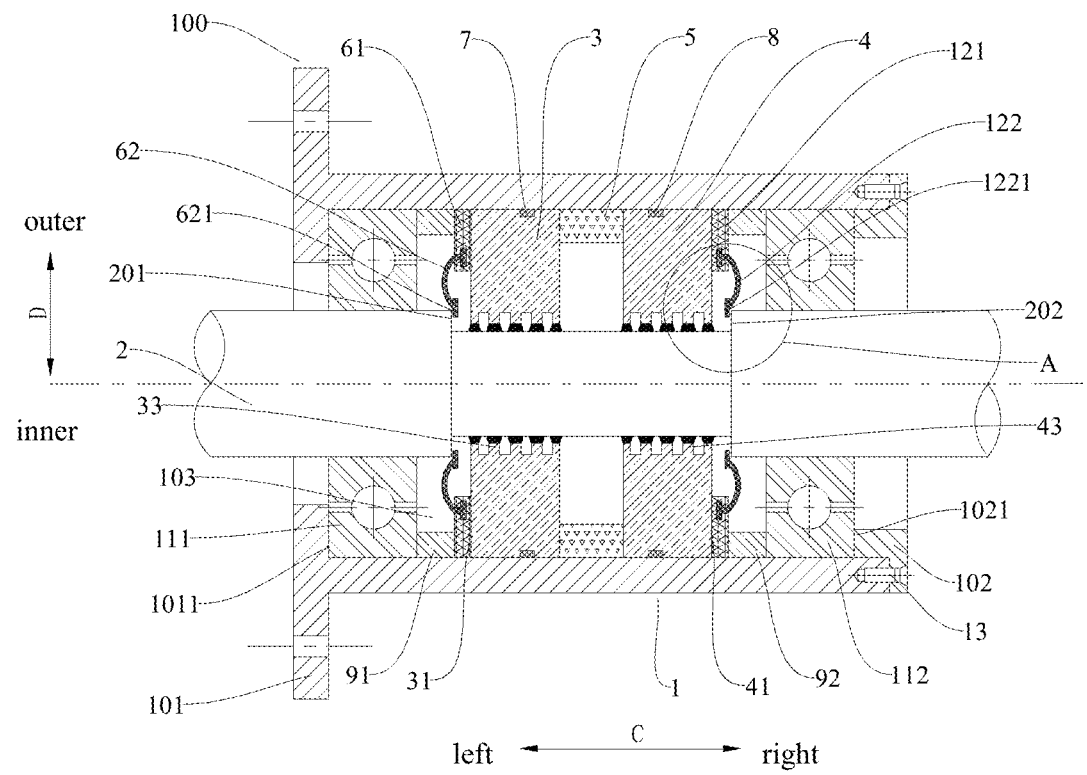
FIG. 1 is a schematic view of a magnetic liquid sealing device according to an embodiment of the present disclosure.
Figure 2:
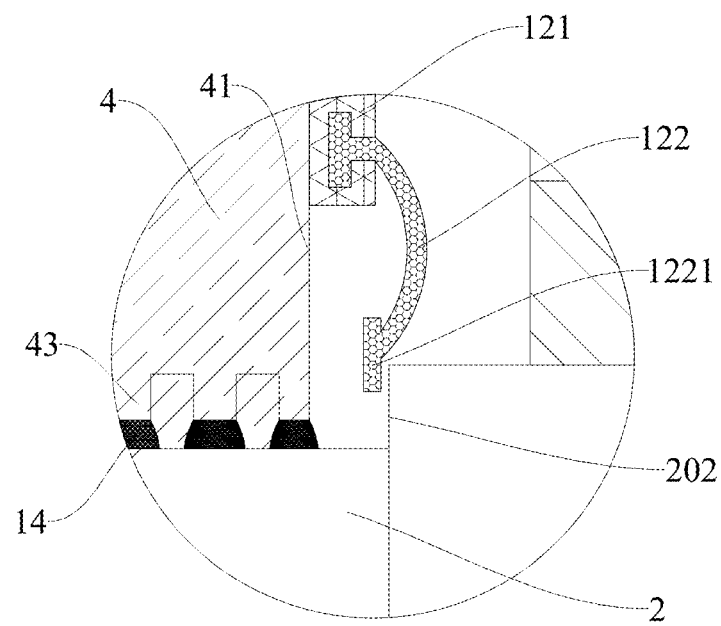
FIG. 2 is an enlarged view of a part A in FIG. 1.

Embodiments of the present disclosure will be described in detail below, and examples of the embodiments will be illustrated in the accompanying drawings. The embodiments described below with reference to the accompanying drawings are exemplary, are merely used to explain the present disclosure, and cannot be construed to limit the present disclosure.

As illustrated in FIGS. 1-4, a magnetic liquid sealing device 100 according to embodiments of the present disclosure includes a housing 1, a rotating shaft 2, a pole shoe, a permanent magnet 5 and a first sealing ring 6. The housing 1 defines a cavity 103, the rotating shaft 2 is rotatably arranged in the cavity 103, and the rotating shaft 2 is provided with an annular first stop portion 201. The permanent magnet 5 is fitted over the rotating shaft 2. The pole shoe is fitted over the rotating shaft 2, the pole shoe has a first end face 31 and a second end face 41 opposite to each other in an axial direction of the rotating shaft 2, and the first end face 31 is located between the first stop portion 201 and the second end face 41 in the axial direction of the rotating shaft 2. Furthermore, although both the permanent magnet 5 and the pole shoe are fitted over the rotating shaft 2, a gap between the permanent magnet 5 and the rotating shaft 2 is much larger than a gap between the pole shoe and the rotating shaft 2. In some embodiments, an outer peripheral surface of the permanent magnet 5 is flush with an outer peripheral surface of the pole shoe.

The first sealing ring 6 is fitted over the rotating shaft 2. The first sealing ring 6 includes a first part 61 and a second part 62, and the first part 61 is connected to or integrated with the second part 62. The first part 61 is located at an outer side of the second part 62 in an inner-outer direction, and the first part 61 is sealedly fitted with at least one of the first end face 31 and an inner peripheral surface of the housing 1. The second part 62 has an inner end and an outer end opposite to each other in the inner-outer direction, and the inner end of the second part 62 is a first free end 621. The first free end 621 is arranged to be movable along the axial direction of the rotating shaft 2. The first free end 621 has a first initial position in which the first free end 621 is spaced apart from the first stop portion 201 and is adjacent to the first stop portion 201 in the axial direction of the rotating shaft 2, and a first sealing position in which the first free end 621 sealedly abuts against the first stop portion 201.

Furthermore, although both the first sealing ring 6 and the pole shoe are fitted over the rotating shaft 2, a gap between the first sealing ring 6 and the rotating shaft 2 is much larger than the gap between the pole shoe and the rotating shaft 2. In some embodiments, an outer peripheral surface of the first sealing ring 6 is flush with an outer peripheral surface of the pole shoe.

The first part 61 of the first sealing ring 6 being sealedly fitted with at least one of the first end face 31 and the inner peripheral surface of the housing 1 refers to that the first part 61 of the first sealing ring 6 is sealedly fitted with the first end face 31, or the first part 61 of the first sealing ring 6 is sealedly fitted with the inner peripheral surface of the housing 1, or the first part 61 of the first sealing ring 6 is sealedly fitted with each of the first end face 31 and the inner peripheral surface of the housing 1. For example, a first sealing annular groove is formed in an end face of the first part 61 opposite to the first end face 31, and a first sealing rubber ring is arranged in the first sealing annular groove. The first sealing rubber ring is clamped between the first part 61 and the first end face 31, such that the first part 61 and the first end face 31 are sealedly fitted with each other.

In the related art, when the magnetic liquid sealing device is mounted on a apparatus to seal a high-pressure liquid, during the working process of the apparatus, an external pressure at an end of the pole shoe of the magnetic liquid sealing device adjacent to the apparatus is relatively high, the pressure between two adjacent pole teeth of the pole shoe adjacent to the apparatus is also relatively high, and the closer to the apparatus, the higher the pressure between the two adjacent pole teeth. When the apparatus stops, the external pressure at the end of the pole shoe adjacent to the apparatus decreases suddenly, the pressure between the two adjacent pole teeth of the pole shoe adjacent to the apparatus is still relatively high and is higher than the external pressure. Thus, a pressure difference between two axial sides of the pole tooth of the pole shoe adjacent to the apparatus is relatively high in this case. The pressure difference tends to wash the magnetic liquid at a sealing gap of the corresponding pole teeth out of the sealing gap, thus causing a reduction of the magnetic liquid at the sealing gap, which eventually affects a pressure resistance of sealing of the magnetic liquid sealing device, and even leads to the problem of a sealing failure of the magnetic liquid sealing device in the next use.

When the magnetic liquid sealing device 100 according to the embodiments of the present disclosure is mounted to the apparatus for use, the first end face 31 of the pole shoe is arranged adjacent to the apparatus. Before the apparatus works, the first free end 621 is in the first initial position. In this case, the first free end 621 is spaced apart from the first stop portion 201 and is adjacent to the first stop portion 201 in the axial direction of the rotating shaft 2. During the working process of the apparatus, the first free end 621 is spaced apart from the first stop portion 201, that is, the first free end 621 is not in contact with the first stop portion 201 of the rotating shaft 2. Thus, the first free end 621 and the first stop portion 201 can be prevented from being worn due to friction, and also, the first free end 621 and the first stop portion 201 can be prevented from being heated up due to friction, which otherwise will affects the working performance of the magnetic liquid sealing device 100.

When the apparatus stops, due to a sudden decrease of the external pressure, the pressure at the first end face 31 of the pole shoe is higher than the external pressure, such that the first free end 621 of the first sealing ring 6 is pushed to the first sealing position by the pressure difference. In this case, the first part 61 of the first sealing ring 6 is sealedly fitted with at least one of the first end face 31 and the inner peripheral surface of the housing 1, and the first free end 621 of the first sealing ring 6 sealedly abuts against the first stop portion 201, such that the first sealing ring 6, the housing 1, the pole shoe, the rotating shaft 2 and the magnetic liquid 14 define an enclosed space separated from the outside. In the enclosed space, the pressure nearby the first end face 31 of the pole shoe is still relatively high, and is even close to the pressure nearby the first end face 31 when the apparatus works. Compared to the magnetic liquid sealing device in the related art, the pressure difference between the two axial sides of the pole tooth of the pole shoe adjacent to the apparatus is relatively low, so as to effectively prevent the magnetic liquid 14 at the sealing gap of the pole tooth from being washed out of the sealing gap, thus ensuring the sufficient magnetic liquid 14 at the pole tooth of the pole shoe.

In addition, even if the magnetic liquid 14 at the sealing gap of the pole tooth of the pole shoe adjacent to an end of the apparatus is washed out of the sealing gap, the first sealing ring 6 may prevent the magnetic liquid 14 from being sprayed too far, that is, the washed-out magnetic liquid 14 can only be in an interior of the enclosed space. In this way, the washed-out magnetic liquid 14 may return to the sealing gap under a magnetic force of the permanent magnet 5, so as to further ensure the sufficient magnetic liquid 14 at the pole tooth of the pole shoe.

Therefore, the magnetic liquid sealing device 100 according to the embodiments of the present disclosure has advantages of a good pressure resistance of sealing or the like.

As illustrated in FIGS. 1-4, the magnetic liquid sealing device 100 according to the embodiments of the present disclosure includes a housing 1, a rotating shaft 2, a pole shoe, a permanent magnet 5 and a first sealing ring 6.

For example, the axial direction of the rotating shaft 2 is consistent with a left-right direction. The housing 1 includes a main body 101 and an end cover 102. The main body 101 has a first end portion 1012 (a left end portion) and a second end portion 1013 (a right end portion) opposite to each other in the axial direction of the rotating shaft 2. The end cover 102 is fixed to the right end portion of the rotating shaft 2 by means of a screw 13, such that the housing 1 defines a cavity 103, and the rotating shaft 2 is rotatably arranged in the cavity 103. The left-right direction is illustrated by an arrow C in FIG. 1.

The pole shoe has a first end face 31 and a second end face 41 opposite to each other in the axial direction of the rotating shaft 2, and the first end face 31 is located between the first stop portion 201 and the second end face 41 in the axial direction of the rotating shaft 2.

In some embodiments, the rotating shaft 2 has a first shaft shoulder and the first shaft shoulder serves as the first stop portion 201.

The first sealing ring 6 is fitted over the rotating shaft 2. The first sealing ring 6 includes a first part 61 and a second part 62. The first part 61 is connected to or integrated with the second part 62. The first part 61 is located on an outer side of the second part 62 in the inner-outer direction, and the first part 61 is sealedly fitted with at least one of the first end face 31 and the inner peripheral surface of the housing 1. The second part 62 has an inner end and an outer end opposite to each other in the inner-outer direction, and the inner end of the second part 62 is a first free end 621. The first free end 621 is arranged to be movable along the axial direction of the rotating shaft 2. The first free end 621 has a first initial position in which the first free end 621 is spaced apart from the first stop portion 201 and is adjacent to the first stop portion 201 in the axial direction of the rotating shaft 2, and a first sealing position in which the first free end 621 sealedly abuts against the first stop portion 201. An inner end of the pole shoe is arranged adjacent to the rotating shaft 2 relative to an outer end of the pole shoe, and the inner-outer direction is illustrated by an arrow D in FIG. 1.

In some embodiments, the rotating shaft 2 is provided with an annular second stop portion 202, and the second stop portion 202 and the first stop portion 201 are spaced apart along the axial direction of the rotating shaft 2. In some embodiments, the rotating shaft 2 has a second shaft shoulder and the second shaft shoulder serves as the second stop portion 202. The second end face 41 is located between the second stop portion 202 and the first end face 31 in the axial direction of the rotating shaft 2.

The magnetic liquid sealing device further includes a second sealing ring 12 fitted over the rotating shaft 2, the second sealing ring 12 includes a third part 121 and a fourth part 122, and the third part 121 is connected to or integrated with the fourth part 122. The third part 121 is located on an outer side of the fourth part 122 in the inner-outer direction. The third part 121 is sealedly fitted with at least one of the second end face 41 and the inner peripheral surface of the housing 1, the fourth part 122 has an inner end and an outer end opposite to each other in the inner-outer direction, and the inner end of the fourth part 122 is a second free end 1221. The second free end 1221 is arranged to be movable along the axial direction of the rotating shaft 2. The second free end 1221 has a second initial position in which the second free end 1221 is spaced apart from the second stop portion 202 and is adjacent to the second stop portion 202 in the axial direction of the rotating shaft 2, and a second sealing position in which the second free end 1221 sealedly abuts against the second stop portion 202.

Furthermore, although both the second sealing ring 12 and the pole shoe are fitted over the rotating shaft 2, a gap between the second sealing ring 12 and the rotating shaft 2 is much larger than the gap between the pole shoe and the rotating shaft 2. In some embodiments, an outer peripheral surface of the second sealing ring 12 is flush with an outer peripheral surface of the pole shoe.

The third part 121 of the second sealing ring 12 being sealedly fitted with at least one of the second end face 41 and the inner peripheral surface of the housing 1 refers to that the third part 121 of the second sealing ring 12 is sealedly fitted with the second end face 41, or the third part 121 of the second sealing ring 12 is sealedly fitted with the inner peripheral surface of the housing 1, or the third part 121 of the second sealing ring 12 is sealedly fitted with each of the second end face 41 and the inner peripheral surface of the housing 1. For example, a second sealing annular groove is formed in an end face of the third part 121 opposite to the second end face 41, and a second sealing rubber ring is arranged in the second sealing annular groove. The second sealing rubber ring is clamped between the third part 121 and the second end face 41, such that the third part 121 and the second end face 41 are sealedly fitted with each other.

When the magnetic liquid sealing device 100 according to the embodiments of the present disclosure is mounted to the apparatus for use, the second end face 41 of the pole shoe is arranged away from the apparatus. Before the apparatus works, the second free end 1221 is in the second initial position. In this case, the second free end 1221 is spaced apart from the second stop portion 202 and is adjacent to the second stop portion 202 in the axial direction of the rotating shaft 2. When the magnetic liquid sealing device 100 realizes sealing through the magnetic liquid 14 during the working process of the apparatus, the second free end 1221 is spaced apart from the second stop portion 202, that is, the second free end 1221 is not in contact with the second stop portion 202 of the rotating shaft 2. Thus, the second free end 1221 and the second stop portion 202 can be prevented from being worn due to friction, and also, the second free end 1221 and the second stop portion 202 can be prevented from being heated up due to friction, which otherwise will affect the working performance of the magnetic liquid sealing device 100.

When the magnetic liquid 14 of the magnetic liquid sealing device 100 fails to seal a sealing gap between the pole shoe and the rotating shaft 2 during the working process of the apparatus, a high-pressure fluid in the apparatus flows to the second end face 41, and the pressure at the second end face 41 of the pole shoe is higher than the external pressure, such that the second free end 1221 of the second sealing ring 12 is pushed to the second sealing position by the pressure difference. In this case, the third part 121 of the second sealing ring 12 is sealedly fitted with at least one of the second end face 41 and the inner peripheral surface of the housing 1, and the second free end 1221 of the second sealing ring 12 sealedly abuts against the second stop portion 202, such that the second sealing ring 12, the housing 1, the pole shoe, the rotating shaft 2 and the apparatus define an enclosed space separated from the outside, and the high-pressure fluid in the apparatus will not flow out of the enclosed space. The whole sealing of the magnetic liquid sealing device 100 will not fail in a short time, thus facilitating the overhaul and maintenance of the magnetic liquid sealing device 100.

Figure 3:
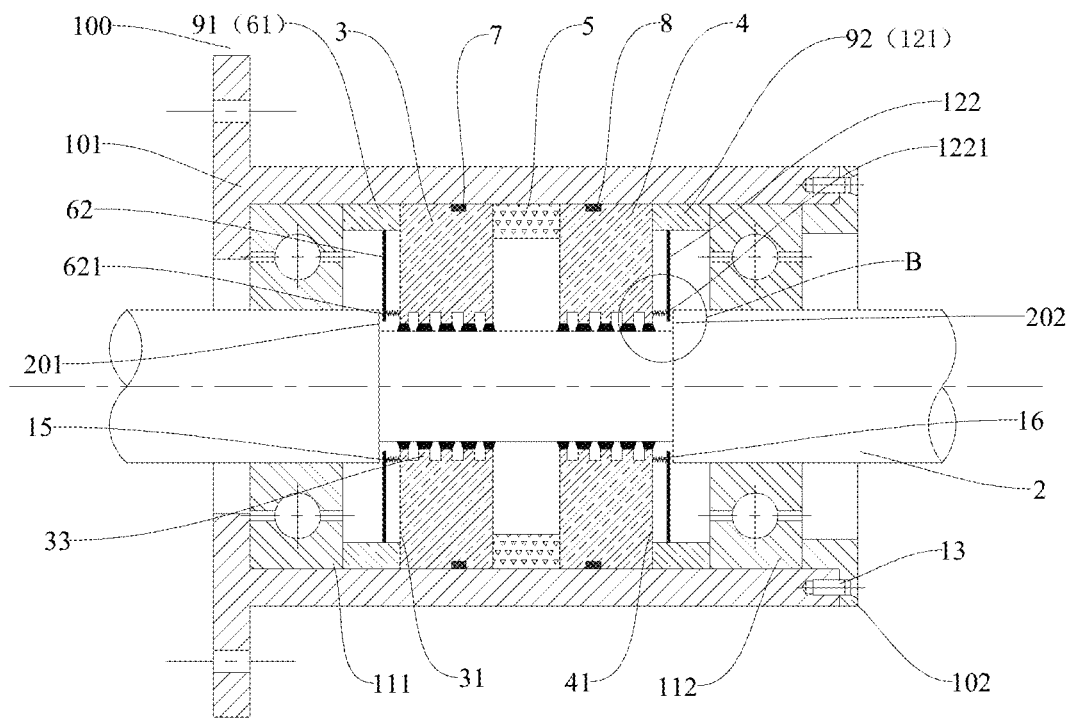
FIG. 3 is a schematic view of a magnetic liquid sealing device according to another embodiment of the present disclosure.
Figure 4:
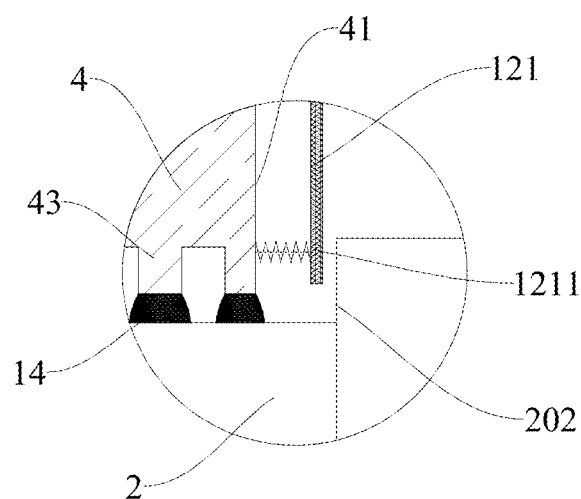
FIG. 4 is an enlarged view of a part B in FIG. 3.

In some embodiments, as illustrated in FIGS. 1 and 3, the pole shoe includes a first pole shoe 3 and a second pole shoe 4, each of which is fitted over the rotating shaft 2, and the first pole shoe 3 and the second pole shoe 4 are spaced apart in the axial direction of the rotating shaft 2. The first pole shoe 3 is located between the first stop portion 201 and the second pole shoe 4 in the axial direction of the rotating shaft 2, the second pole shoe 4 is located between the second stop portion 202 and the first pole shoe 3 in the axial direction of the rotating shaft 2, the first end face 31 is arranged on the first pole shoe 3, and the second end face 41 is arranged on the second pole shoe 4. Thus, the pressure resistance of sealing of the magnetic liquid sealing device 100 may be improved by using the two pole shoes, i.e. the first pole shoe 3 and the second pole shoe 4.

For example, as illustrated in FIGS. 1 and 3, the first pole shoe 3 is located on a left side of the second pole shoe 4 in the axial direction of the rotating shaft 2, the first pole shoe 3 is located on a right side of the first stop portion 201 in the axial direction of the rotating shaft 2, and the second pole shoe 4 is located on a left side of the second stop portion 202 in the axial direction of the rotating shaft 2. The first pole shoe 3 has a first end portion (a left end portion) and a second end portion (a right end portion) opposite to each other in the axial direction of the rotating shaft 2, and the second pole shoe 4 has a first end portion (a left end portion) and a second end portion (a right end portion) opposite to each other in the axial direction of the rotating shaft 2. The second end portion (the right end portion) of the first pole shoe 3 is spaced apart from the first end portion (the left end portion) of the second pole shoe 4. A left end face of the first pole shoe 3 serves as the first end face 31, and a right end face of the second pole shoe 4 serves as the second end face 41.

As illustrated in FIGS. 1 and 3, the first pole shoe 3 is provided with a first pole tooth 33, the second pole shoe 4 is provided with a second pole tooth 43, the magnetic liquid 14 is filled at a sealing gap defined by the first pole tooth 33 and the rotating shaft 2 and a sealing gap defined by the second pole tooth 43 and the rotating shaft 2. Of course, the first pole shoe and the second pole shoe may not be provided with the pole tooth, while the rotating shaft may be provided with the pole tooth, such that the sealing gap is defined by the pole tooth and an inner peripheral surface of the corresponding pole shoe.

In some embodiments, the first free end 621 is located between the first stop portion 201 and the first end face 31 in the axial direction of the rotating shaft 2, and the second part 62 may be elastically deformed such that the first free end 621 can move along the axial direction of the rotating shaft 2.

The second free end 1221 is located between the second stop portion 202 and the second end face 41 in the axial direction of the rotating shaft 2, and the fourth part 122 may be elastically deformed such that the second free end 1221 can move along the axial direction of the rotating shaft 2.

The second part 62 of the first sealing ring 6 being elastically deformed refers to that when a pressure difference between two opposite sides of the second part 62 in the axial direction of the rotating shaft 2 reaches a preset value, the second part 62 is elastically deformed, and when the pressure difference between the two opposite sides of the second part 62 in the axial direction of the rotating shaft 2 does not exist, or the pressure difference between the two opposite sides of the second part 62 in the axial direction of the rotating shaft 2 does not reach the preset value, the second part 62 will not be deformed elastically.

The fourth part 122 of the second sealing ring 12 being elastically deformed refers to that when a pressure difference between two opposite sides of the fourth part 122 in the axial direction of the rotating shaft 2 reaches a preset value, the fourth part 122 is elastically deformed, and when the pressure difference between the two opposite sides of the fourth part 122 in the axial direction of the rotating shaft 2 does not exist, or the pressure difference between the two opposite sides of the fourth part 122 in the axial direction of the rotating shaft 2 does not reach the preset value, the fourth part 122 will not be deformed elastically.

Thus, it is convenient for the first free end 621 and the second free end 1221 to move in the axial direction of the rotating shaft 2.

Of course, the outer end of the second part may also be hinged to the first part, and the outer end of the fourth part may be hinged to the third part, such that the first free end and the second free end move along the axial direction of the rotating shaft by swinging.

In some embodiments, a cross section of the second part 62 includes a first section portion and a second section portion located on both radial sides of the rotating shaft 2, and each of the first section portion and the second section portion has a substantial C shape. A cross section of the fourth part 122 includes a third section portion and a fourth section portion located on both radial sides of the rotating shaft 2, and each of the third section portion and the fourth section portion has a substantial C shape.

Therefore, lateral areas of the second part 62 on the two opposite sides in the axial direction of the rotating shaft 2 are relatively large, and side areas of the fourth part 122 on the two opposite sides in the axial direction of the rotating shaft 2 are also relatively large, such that the second part 62 and the fourth part 122 may be elastically deformed when the pressure difference between the two sides is relatively low, which is conducive to improving the sealing performance of the magnetic liquid sealing device 100.

In some embodiments, the first part 61 is provided with a first mounting groove, and the outer end of the second part 62 is arranged in the first mounting groove with an interference fit. The third part 121 is provided with a second mounting groove, and the outer end of the fourth part 122 is arranged in the second mounting groove with an interference fit. Thus, it is convenient to design and process the first part 61, the second part 62, the third part 121 and the fourth part 122, and to connect the first part 61 with the second part 62 and to connect the third part 121 with the fourth part 122.

In some embodiments, the magnetic liquid sealing device 100 further includes a first elastic member 15 configured to exert an elastic force facing away from the first end face 31 to the first free end 621 and a second elastic member 16 configured to exert an elastic force facing away from the second end face 41 to the second free end 1221.

Thus, the first free end 621 is held at the first initial position by the first elastic member 15, and the second free end 1221 is held at the second initial position by the second elastic member 16, so as to avoid that the first free end 621 cannot be moved to the first sealing position along the axial direction of the rotating shaft 2 under the action of the pressure difference because of the first free end 621 being closely fitted with the first end face 31, and that the second free end 1221 cannot be moved to the second sealing position along the axial direction of the rotating shaft 2 under the action of the pressure difference because of the second free end 1221 being closely fitted with the second end face 41, which is further conductive to improving the pressure resistance of sealing of the magnetic liquid sealing device 100.

In some embodiments, each of the first elastic member 15 and the second elastic member 16 is a compression spring, the first elastic member 15 is arranged between the first end face 31 and the first free end 621, and the second elastic member 16 is arranged between the second end face 41 and the second free end 1221. Thus, it is convenient to mount the first elastic member 15 and the second elastic member 16.

In some embodiments, the permanent magnet 5 is located between the first pole shoe 3 and the second pole shoe 4 in the axial direction of the rotating shaft 2. Thus, the permanent magnet 5 exerts a magnetic force to the magnetic liquid 14 at the sealing gap between the first pole shoe 3 and the rotating shaft 2, and to the magnetic liquid 14 at the sealing gap between the second pole shoe 4 and the rotating shaft 2, which is conductive to reducing an overall size of the magnetic liquid sealing device, compared to that two permanent magnets are arranged to exert a magnetic force to the magnetic liquid at the sealing gap between the first pole shoe and the rotating shaft, and to the magnetic liquid at the sealing gap between the second pole shoe and the rotating shaft, respectively.

In some embodiments, as illustrated in FIGS. 1 and 3, the magnetic liquid sealing device 100 further includes a first sealing gasket 7 and a second sealing gasket 8. An outer peripheral surface of the first pole shoe 3 is provided with a first annular groove, the first sealing gasket 7 is fixedly mounted in the first annular groove, and an outer peripheral surface of the first sealing gasket 7 is fitted with the inner peripheral surface of the housing 1. An outer peripheral surface of the second pole shoe 4 is provided with a second annular groove, the second sealing gasket 8 is fixedly mounted in the second annular groove, and an outer peripheral surface of the second sealing gasket 8 is fitted with the inner peripheral surface of the housing 1.

Thus, the first sealing gasket 7 is used to ensure the sealing performance between the first pole shoe 3 and the inner peripheral surface of the housing 1, and the second sealing gasket 8 is used to ensure the sealing performance between the second pole shoe 4 and the inner peripheral surface of the housing 1, so as to further improve the pressure resistance of sealing of the magnetic liquid sealing device 100.

In addition, as illustrated in FIGS. 1 and 3, the magnetic liquid sealing device 100 further includes a bearing arranged in the cavity 103 and fitted over the rotating shaft 2.

For example, the bearing includes a first bearing 111 and a second bearing 112. Each of the first bearing 111 and the second bearing 112 is arranged in the cavity 103, and fitted over the rotating shaft 2. Thus, it is convenient for the rotating shaft 2 to be mounted inside the cavity 103.

In addition, as illustrated in FIGS. 1 and 3, the magnetic liquid sealing device 100 further includes a first positioning block 91 and a second positioning block 92. Each of the first positioning block 91 and the second positioning block 92 is arranged in the cavity 103 and fitted over the rotating shaft 2. The first positioning block 91 serves as the first part 61 of the first sealing ring 6 illustrated in FIGS. 3 and 4, and the second positioning block 92 serves as the third part 121 of the second sealing ring 12 illustrated in FIGS. 3 and 4.

As illustrated in FIGS. 1 and 3, the main body 101 has a first stop face 1011, and the end cover 102 has a second stop face 1021. The first bearing 111 is mounted between the first stop face 1011 and the first positioning block 91, the second part 62 is mounted between the first positioning block 91 and the first pole shoe 3, the second bearing 112 is mounted between the second stop face 1021 and the second positioning block 92, and the fourth part 122 is mounted between the second positioning block 92 and the second pole shoe 4.

A specific working mode of the magnetic liquid sealing device 100 according to the embodiments of the present disclosure is described below with reference to FIGS. 1-4.

It is assumed that a left side of the apparatus sealed by the magnetic liquid sealing device 100 is in a high-pressure state while this apparatus is working. Before the apparatus works, the first free end 621 of the first sealing ring 6 is in the first initial position, and the second free end 1221 of the second sealing ring 12 is in the second initial position.

When the apparatus works normally, the pressure on the left side of the magnetic liquid sealing device 100 is high and the pressure on the right side of the magnetic liquid sealing device 100 is low, and the pressure on the left side of the first end face 31 is high and the pressure on the right side of the first end face 31 is low. A relatively large pressure difference exits between the left side and the right side of the second part 62 of the first sealing ring 6, and the pressure difference causes the second part 62 to be deformed elastically, such that the first free end 621 moves away from the first stop portion 201. In this case, the first sealing ring 6 has no sealing effects, and the pressure difference will gradually decrease from left to right along the pole shoe until the magnetic liquid 14 seals the sealing gap between the pole shoe and the rotating shaft 2 completely. If the magnetic liquid 14 fails to seal the sealing gap between the pole shoe and the rotating shaft 2 while the apparatus is working, the high-pressure liquid will flow to the second end face 41, such that the pressure on the left side of the second end face 41 is high and the pressure on the right side of the second end face 41 is low. A relatively large pressure difference exists between the left side and the right side of the fourth part 122 of the second sealing ring 12, and the pressure difference causes the fourth part 122 to be deformed elastically, such that the second free end 1221 sealedly abuts against the second stop portion 202 so as to prevent a liquid leakage in a short time.

When the apparatus stops, the pressure on the left side of the magnetic liquid sealing device 100 suddenly decreases, the pressure on the left side of the second part 62 of the first sealing ring 6 is low and the pressure on the right side of the second part 62 of the first sealing ring 6 is high. A relatively large pressure difference exists between the left side and the right side of the second part 62 of the first sealing ring 6, and the pressure difference causes the second part 62 to be deformed elastically, such that the first free end 621 sealedly abuts against the first stop portion 201. Thus, the first sealing ring 6, the pole shoe, the housing 1, the rotating shaft 2 and the magnetic liquid 14 define an enclosed space with a stable pressure so as to avoid a loss of the magnetic liquid 14.

In the description of the present disclosure, it should be understood that terms such as "central," "longitudinal," "transverse," "length," "width," "thickness," "up," "down," "front," "rear," "left," "right," "vertical," "horizontal," "top," "bottom," "inner," "outer," "clockwise," "counterclockwise," "axial," "radial," "circumferential" and the like should be construed to refer to the orientation as then described or as illustrated in the drawings under discussion. These terms are for convenience and simplification of description and do not indicate or imply that the device or element referred to must have a particular orientation, or be constructed and operated in a particular orientation, so these terms shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may include at least one of the features. In the description of the present disclosure, "a plurality of" means at least two, such as two, three and the like, unless specified otherwise.

In the present disclosure, it should be noted, unless specified or limited otherwise, the terms "mounted," "connected," "coupled," "fixed" or the like are used broadly. The terms may indicate, for example, fixed connections, detachable connections, or integral connections, may also indicate mechanical or electrical connections or mutual communication, may also indicate direct connections or indirect connections via intermediate media, and may also indicate inner communications or mutual interaction of two elements, unless specified otherwise. The specific meanings of the terms in embodiments of the present disclosure can be understood by those skilled in the art according to specific circumstances.

In the present disclosure, unless expressly specified and limited otherwise, a structure in which a first feature is "on" or "below" a second feature may include an embodiment in which the first feature is in direct contact with the second feature, and may also include an embodiment in which the first feature and the second feature are in contact with each other via intermediate media. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout the present disclosure to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

The invention claimed is:

1. A magnetic liquid sealing device, comprising:
    a housing defining a cavity therein;
    a rotating shaft rotatably arranged in the cavity and provided with an annular first stop portion and an annular second stop portion, the first stop portion and the second stop portion being spaced apart along an axial direction of the rotating shaft;
    a first pole shoe and a second pole shoe fitted over the rotating shaft, the first pole shoe and the second pole shoe being spaced apart along the axial direction of the rotating shaft, the first pole shoe having a first end face and the second pole shoe having a second end face opposite to each other in the axial direction of the rotating shaft, the first end face being arranged between the first stop portion and the second end face in the axial direction of the rotating shaft, the second end face being arranged between the second stop portion and the first end face in the axial direction of the rotating shaft, and a magnetic fluid being filled between the first pole shoe and the rotating shaft and between the second pole shoe and the rotating shaft;
    a permanent magnet fitted over the rotating shaft, the permanent magnet being arranged between the first pole shoe and the second pole shoe in the axial direction of the rotating shaft;
    a first sealing ring fitted over the rotating shaft, the first sealing ring comprising a first part and a second part, the first part being connected to or integrated with the second part, the first part being arranged at an outer side of the second part in an inner-outer direction, the first part being sealedly fitted with at least one of the first end face and an inner peripheral surface of the housing, the second part having an inner end and an outer end opposite to each other in the inner-outer direction, the inner end of the second part being a first free end movably arranged along the axial direction of the rotating shaft, the first free end having a first initial position in which the first free end is spaced apart from the first stop portion and adjacent to the first stop portion in the axial direction of the rotating shaft, and a first sealing position in which the first free end sealedly abuts against the first stop portion, wherein the first free end is movable between the first initial position and the first sealing position based on a pressure difference between a pressure at the first end face and an external pressure of the first sealing ring; and
    a second sealing ring fitted over the rotating shaft, the second sealing ring comprising a third part and a fourth part, the third part being connected to or integrated with the fourth part, the third part being arranged at an outer side of the fourth part in the inner-outer direction, the third part being sealedly fitted with at least one of the second end face and the inner peripheral surface of the housing, the fourth part having an inner end and an outer end opposite to each other in the inner-outer direction, the inner end of the fourth part being a second free end movably arranged along the axial direction of the rotating shaft, the second free end having a second initial position in which the second free end is spaced apart from the second stop portion and adjacent to the second stop portion in the axial direction of the rotating shaft, and a second sealing position in which the second free end sealedly abuts against the second stop portion, wherein the second free end is movable between the second initial position and the second sealing position based on a pressure difference between a pressure at the second end face and an external pressure of the second sealing ring.

2. The magnetic liquid sealing device according to claim 1, wherein the first free end is arranged between the first stop portion and the first end face in the axial direction of the rotating shaft, and the second part is configured to be elastically deformed such that the first free end moves along the axial direction of the rotating shaft, and
    the second free end is arranged between the second stop portion and the second end face in the axial direction of the rotating shaft, and the fourth part is configured to be elastically deformed such that the second free end moves along the axial direction of the rotating shaft.

3. The magnetic liquid sealing device according to claim 2, wherein a cross section of the second part comprises a first section portion and a second section portion arranged on both radial sides of the rotating shaft, and each of the first section portion and the second section portion has a substantial C shape, and
    a cross section of the fourth part comprises a third section portion and a fourth section portion arranged on both radial sides of the rotating shaft, and each of the third section portion and the fourth section portion has a substantial C shape.

4. The magnetic liquid sealing device according to claim 2, wherein the first part is provided with a first mounting groove, and the outer end of the second part is arranged in the first mounting groove with an interference fit,
the third part is provided with a second mounting groove, and the outer end of the fourth part is arranged in the second mounting groove with an interference fit.

5. The magnetic liquid sealing device according to claim 2, further comprising a first elastic member configured to exert an elastic force facing away from the first end face to the first free end and a second elastic member configured to exert an elastic force facing away from the second end face to the second free end.

6. The magnetic liquid sealing device according to claim 5, wherein each of the first elastic member and the second elastic member is a compression spring, the first elastic member is arranged between the first end face and the first free end, and the second elastic member is arranged between the second end face and the second free end.

7. The magnetic liquid sealing device according to claim 6, further comprising a first sealing gasket and a second sealing gasket, an outer peripheral surface of the first pole shoe being provided with a first annular groove, the first sealing gasket being fixedly mounted in the first annular groove, an outer peripheral surface of the first sealing gasket being fitted with the inner peripheral surface of the housing, an outer peripheral surface of the second pole shoe being provided with a second annular groove, the second sealing gasket being fixedly mounted in the second annular groove, and an outer peripheral surface of the second sealing gasket being fitted with the inner peripheral surface of the housing.

\* \* \* \* \*